United States Patent [19]

Turner et al.

[11] Patent Number: 4,461,386

[45] Date of Patent: Jul. 24, 1984

[54] RACK FOR TRANSPORTING RECORDED DISCS

[75] Inventors: Robert L. Turner, Mooresville; Robert E. Jennings, Indianapolis, both of Ind.

[73] Assignee: RCA Corporation, New York, N.Y.

[21] Appl. No.: 263,123

[22] Filed: May 13, 1981

[51] Int. Cl.³ .............................................. A47G 29/00
[52] U.S. Cl. ..................................... 211/41; 118/500; 211/113; 269/43; 269/46; 269/296; 312/10
[58] Field of Search .......................... 211/40, 41, 113; 206/493, 311; 312/9, 10, 11, 12, 13, 14; 118/500, 501; 269/43, 46, 296; 248/470, 339, 340, 62, 126, DIG. 14

[56] References Cited

U.S. PATENT DOCUMENTS

| | | | |
|---|---|---|---|
| 663,537 | 12/1900 | Furniss | 248/122 |
| 1,429,076 | 9/1922 | Helsley | 211/40 X |
| 2,078,613 | 4/1937 | Sieber | 211/113 |
| 2,377,904 | 6/1945 | Roach | 269/43 X |
| 2,499,188 | 2/1950 | Freeman | 248/340 |
| 2,532,255 | 11/1950 | Davis | 248/340 |
| 2,946,453 | 7/1960 | Pityo | 211/41 |
| 3,472,386 | 10/1969 | Osojnak | 211/40 |
| 3,610,613 | 10/1971 | Worden | 211/41 X |
| 3,675,299 | 7/1972 | Sherrill, Jr. | 269/43 X |
| 4,355,974 | 10/1982 | Lee | 211/40 |

FOREIGN PATENT DOCUMENTS

| | | | |
|---|---|---|---|
| 554275 | 7/1934 | Fed. Rep. of Germany | 312/13 |
| 1265989 | 5/1961 | France | 248/339 |
| 601325 | 4/1978 | U.S.S.R. | 269/46 |

OTHER PUBLICATIONS

*IBM Technical Disclosure Bulletin*, vol. 14, No. 10, (Mar. 1972), "Glass Mask Process Rack".

Primary Examiner—J. Franklin Foss
Assistant Examiner—David L. Talbott
Attorney, Agent, or Firm—Birgit E. Morris; Donald S. Cohen

[57] ABSTRACT

A rack for use in carrying recorded discs through a cleaning operation includes a substantially C-shaped rod having a hook at its top end and three sets of spaced posts extending from the sides of a circular bottom portion. A separate plastic spindle is mounted on each of the posts with each spindle having a plurality of spaced annular grooves in its outer surface. The recorded discs are adapted to be set in the grooves in the spindles to support the discs on the rack.

5 Claims, 4 Drawing Figures

RACK FOR TRANSPORTING RECORDED DISCS

BACKGROUND OF THE INVENTION

The present invention relates to a rack for transporting recorded discs, and particularly to a rack for carrying the discs through washing, rinsing and drying tanks.

Recorded discs generally comprise a circular flat plate or disc of a plastic material having a center hole therethrough and recorded information provided thereon in the form of a surface relief pattern formed along a track in the major surfaces of the disc. The surface relief patterns can be formed in a spiral groove, for example, in the surfaces of the disc. Recently there has been developed a high density recorded disc, such as a video disc, in which there are a large number of grooves per inch of the diameter of the disc, e.g. 10,000 grooves per inch (4000 grooves per cm). Because of the large number of these grooves, they are very narrow and shallow, i.e. 2.7 microns in width and 4000 Angstroms in depth. Because of the fineness of these grooves, any contaminants, such as dirt, dust or other foreign particles, can severely disrupt the operation of the disc and their presence is therefore highly undesirable.

In order to remove contaminants from the surface of the discs, there has been developed a process wherein the discs are immersed in a cleaning solution, such as an aqueous solution of organic alcohol and amines of the type commercially available as 1160B from the Shipley Company, which removes the contaminants. The discs are then rinsed in water to remove the cleaning solution. To insure complete removal of the cleaning solution and contaminants, the discs are rinsed in several baths of water, for example, three baths. The first bath removes most of the cleaning solution, the second bath removes some of the remaining cleaning solution, and the final bath removes the remainder of the cleaning solution. After rinsing the discs are dried by spraying them with an organic solvent, such as 1,1,2-trichloro-2,2,1-trifluoroethane.

The discs are carried through the cleaning, rinsing and drying operations by a conveyor having racks on which a plurality of the discs are mounted. The discs are placed on the racks, which are continuously moving, just before the washing tank and are removed from the racks after they leave the drying chamber. Thus, the racks must be constructed to permit the discs to be easily and quickly mounted on and removed therefrom without damaging the discs. Since the grooves in the discs are so numerous and of very fine dimensions, even the smallest scratch can damage enough of the grooves so as to greatly disrupt the playback of the discs. Also, the racks should be of a minimum mass so that they do not retain thereon any of the liquids through which they pass. Such retained liquid could spatter back on the discs and recontaminate them.

SUMMARY OF THE INVENTION

A rack for use in cleaning recorded discs includes a substantially C-shaped metal rod having means at one end for supporting the rack. A plurality of spindles are secured to the rod in spaced relation adjacent the other end of the rod. The spindles project from the rod in the same direction and are substantially parallel to each other. Each of the spindles has a plurality of spaced grooves in its outer surface.

DETAILED DESCRIPTION

Figure 1:
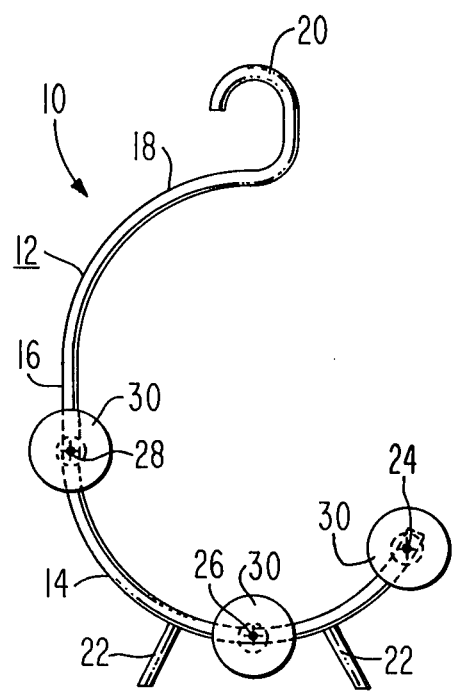
FIG. 1 is a side elevational view of an embodiment of the rack of the present invention.
Figure 2:
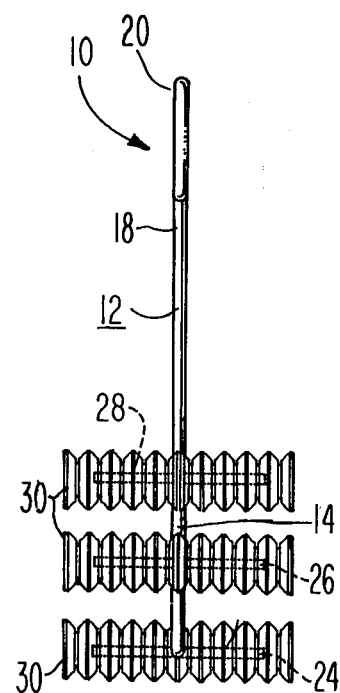
FIG. 2 is an end elevational view of the rack.

Referring to FIG. 1, one form of the rack of the present invention is generally designated as 10. The rack 10 comprises a substantially C-shaped metal rod 12 which is substantially round in transverse cross-section. The rod 12 has a circular bottom portion 14, a straight portion 16 extending from one end of the bottom portion 14, and an arcuate top portion 18 which extends over the bottom portion 14. A hook 20 extends from the end of the top portion 18. The hook 20 permits the rack 10 to be supported on a conveyor. A pair of spaced feet 22 extend radially downwardly from the bottom surface 14. The feet 22 are uniformly spaced on opposite sides of the lowermost point of the bottom portion 14.

Three sets of posts 24, 26, and 28, respectively, are secured to and extend from opposite sides of the bottom portion 14. The posts 24, 26, and 28 are all parallel to each other and the two posts in each set are in alignment with each other. The posts 24 are at the free end of the bottom portion 14, the posts 26 are at the lowermost point of the bottom portion 14, and the posts 28 are at the end of the bottom portion 14 from which the straight portion 16 extends.

Figure 3:
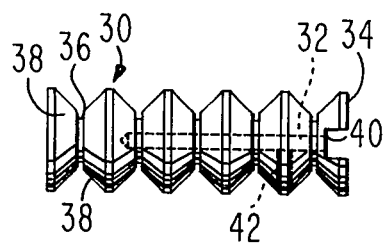
FIG. 3 is an elevational view of one of the spindles used on the rack of the present invention.
Figure 4:
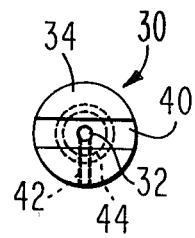
FIG. 4 is an end view of a spindle.

On each of the posts 24, 26, and 28 is a spindle 30 of a plastic material, such as an acetal resin sold as Delrin by E. I. duPont de Nemours & Co. As shown in FIGS. 3 and 4, each of the spindles 30 is a cylindrical body of the plastic material of a length greater than the length of the posts 24, 26, and 28. The spindle 30 has a passage 32 extending longitudinally along its axis from one end 34 thereof and of a length slightly greater than the length of the posts. The spindle 30 has a plurality of spaced annular grooves 36 in its outer surface. Each of the grooves 36 is of a width corresponding to the thickness of a recorded disc. The sidewalls of the grooves 36 have portions 38 at the outer surface of the spindle which are tapered at an angle of approximately 45 degrees to permit ease of insertion of a record in the grooves. The end 34 of the spindle 30 has a slot 40 extending transversely thereacross. The slot 40 is of a width corresponding to the thickness of the rod 12. A threaded hole 42 extends radially through the spindle 30 to the passage 32 between two of the grooves 36. A set screw 44 is threaded in the hole 42. Each of the spindles 30 is mounted on a separate post 24, 26, and 28, respectively, with the posts fitting in the passage 32 and the slot 40 receiving the adjacent portion of the bottom portion 14 of the rod 12. The set screw 44 is tightened against the respective posts to secure the spindle 30 in the posts.

Since the bottom portion of the rod 12 is circular, the spindles 30 form three support points around a common circle. Each groove 36 in each of the spindles 30 lies in the same plane as corresponding grooves in two of the other spindles so that a recorded disc can be supported in the three aligned grooves. Thus, a plurality of recorded discs can be mounted on the three spindles illustrated on each side of the rod 12 corresponding to the number of grooves in the spindles 30. As shown, there are five grooves in each spindle 30 so that a total of ten recorded discs can be supported on each of the racks 10. The tapered portions 38 of the grooves 36 permit ease of inserting the recorded discs in the grooves 36 without damaging the discs. The rack 10, being formed of a single rod 12, is of a minimum mass so that it will remain little, if any, of the fluids through which the records are carried during the cleaning of the records. Although the rack 10 is shown as having three spindles 30 on each side of the rod 12, it can have any number of spindles greater than two. Three spindles is preferred since they provide good support for the discs with a minimum number of contacts between the discs and the spindles. Thus, there is provided a rack which permits ease of loading and unloading recorded discs therefrom and which minimizes the possibility of recontaminating the cleaned recorded discs.

We claim:

1. A rack for use in cleaning recorded discs comprising a substantially C-shaped metal rod having a circular bottom portion and a hook at the top portion for supporting the rod, three sets of posts secured directly to and extending from opposite sides of the circular bottom portion of the rod with the posts in each set being in alignment and all of the posts being parallel to each other, and a separate spindle on each of the posts with each of the spindles having a plurality of spaced annular grooves in its outer surface.

2. A rack in accordance with claim 1 in which one set of posts is at the free end of the bottom portion, one set of posts is at the bottommost point of the bottom portion, and one set of posts is at the end of the bottom section from which the straight portion extends.

3. A rack in accordance with claim 1 in which each spindle is a cylindrical plastic body having a passage extending longitudinally along its axis from one end onto which the post extends and means extending through the spindle and contacting the posts to secure the spindle to the post.

4. A rack in accordance with claim 3 in which each of the grooves in the spindle has a portion of the sidewalls adjacent the outer surface of the spindle tapered outwardly.

5. A rack in accordance with claim 4 in which each spindle has a notch extending transversely across its one end, said notch receiving the adjacent part of the bottom portion of the rod.

* * * * *